United States Patent [19]

Hagan

[11] Patent Number: 5,319,877

[45] Date of Patent: Jun. 14, 1994

[54] MULTIFUNCTIONAL FISHING TACKLE BOX

[76] Inventor: John F. Hagan, 524 E. Freehold Rd., Freehold, N.J. 07728

[21] Appl. No.: 16,557

[22] Filed: Feb. 11, 1993

[51] Int. Cl.$^5$ ............................................. A01K 97/00
[52] U.S. Cl. ........................................ 43/54.1; 43/56
[58] Field of Search ................... 43/54.1, 57.1, 55, 56; 206/315.11, 315.1, 499

[56] References Cited

U.S. PATENT DOCUMENTS

| | | | |
|---|---|---|---|
| 933,216 | 9/1909 | Wilson | 43/56 |
| 2,623,656 | 12/1952 | Rottau | 206/499 |
| 2,686,383 | 8/1954 | Rubey, Jr. | 43/55 |
| 3,005,671 | 10/1961 | Majeski | 43/54.1 |
| 3,437,389 | 4/1969 | Perkins et al. | 43/54.1 |
| 3,452,469 | 7/1969 | White | 43/55 |
| 3,751,845 | 8/1973 | Van Leeuwen | 43/56 |
| 3,958,359 | 5/1976 | Doughty | 43/55 |
| 4,845,881 | 7/1989 | Ward | 43/55 |

Primary Examiner—Paula A. Bradley
Assistant Examiner—Chuck Y. Mah
Attorney, Agent, or Firm—Howard R. Popper

[57] ABSTRACT

A fishing tackle box is disclosed having an insulated, substantially cylindrical main container provided with a ventilated well for accommodating a bait bucket. A plurality of substantially cylindrical tackle trays are mounted to the upper portion of the main container and provided with a water-tight seal to prevent contamination of the tray contents from spillage from the bait bucket. A substantially cylindrical seat lid is mounted to the upper portion of the uppermost tackle tray.

9 Claims, 2 Drawing Sheets

MULTIFUNCTIONAL FISHING TACKLE BOX

FIELD OF THE INVENTION

This invention relates to a box for containing and transporting the bait as well as the various implements useful in the sport of fishing and, more particularly, to a fishing tackle box capable of functioning as a seat for the fisherman.

BACKGROUND OF THE PRIOR ART

Heretofore a great variety of tackle boxes have been available to the sport fisherman. These boxes have used segmented trays for holding hooks, lures, weights, knives, extra fishing line and the myriad implements that the sport fisherman at one time or another may find useful in landing his elusive quarry. While much thought and effort has been expended in enabling the fisherman to organize and obtain easy access to his equipment, scant consideration has been paid to thoughts of the fisherman's own comfort after arriving at the scene of action. Whether in a boat or on shore after standing a while it would be nice to sit down. Most tackle boxes make very uncomfortable seats. One exception perhaps is the fishing box disclosed in U.S. Pat. No. 4,353,182 issued Oct. 12, 1982 to Junkas, et al. This box incorporates a number of built-in features including life-preserver, fishing rod carrier, bait compartment and fish compartment. While the tackle box of the foregoing patent appears to be roomy and may even provided a comfortable seat, its considerable bulk may be a drawback to some fisherman.

SUMMARY OF THE INVENTION

I have invented a multifunctional tackle and bait box which can also serve as a fisherman's seat. According to the principles of my invention in one illustrative embodiment thereof, I provide a substantially cylindrical or multifaceted series of nested, hollow plastic containers, the deepest of which accommodates an insulated, ventilated receptacle which houses a covered bait bucket and superior air space. Sealably supported immediately above the deepest receptacle's air space is a cylindrical major accessory tray for such fishing accessories as extra weights, pliers, scaler, knife, jigging lures, trolling weights, etc. An additional cylindrical tray is located above the major accessory tray is a shallower segmented tray for containing a variety of hooks, fishing lures, rigs and leaders. Located above the shallow accessory tray is a seat lid which covers the assembly. Advantageously the major accessory tray may be sealably secured to the insulated receptacle to prevent contamination of its contents by spillage from the bait bucket's liquid by means of an embedded O-ring seal or a series of short interrupted or "bayonet" threads. Likewise, the seat lid may be similarly attached to the uppermost tray.

DESCRIPTION OF THE DRAWING

Referring to the drawing there is shown an illustrative embodiment of my invention, in which.

DETAILED DESCRIPTION

Figure 1:
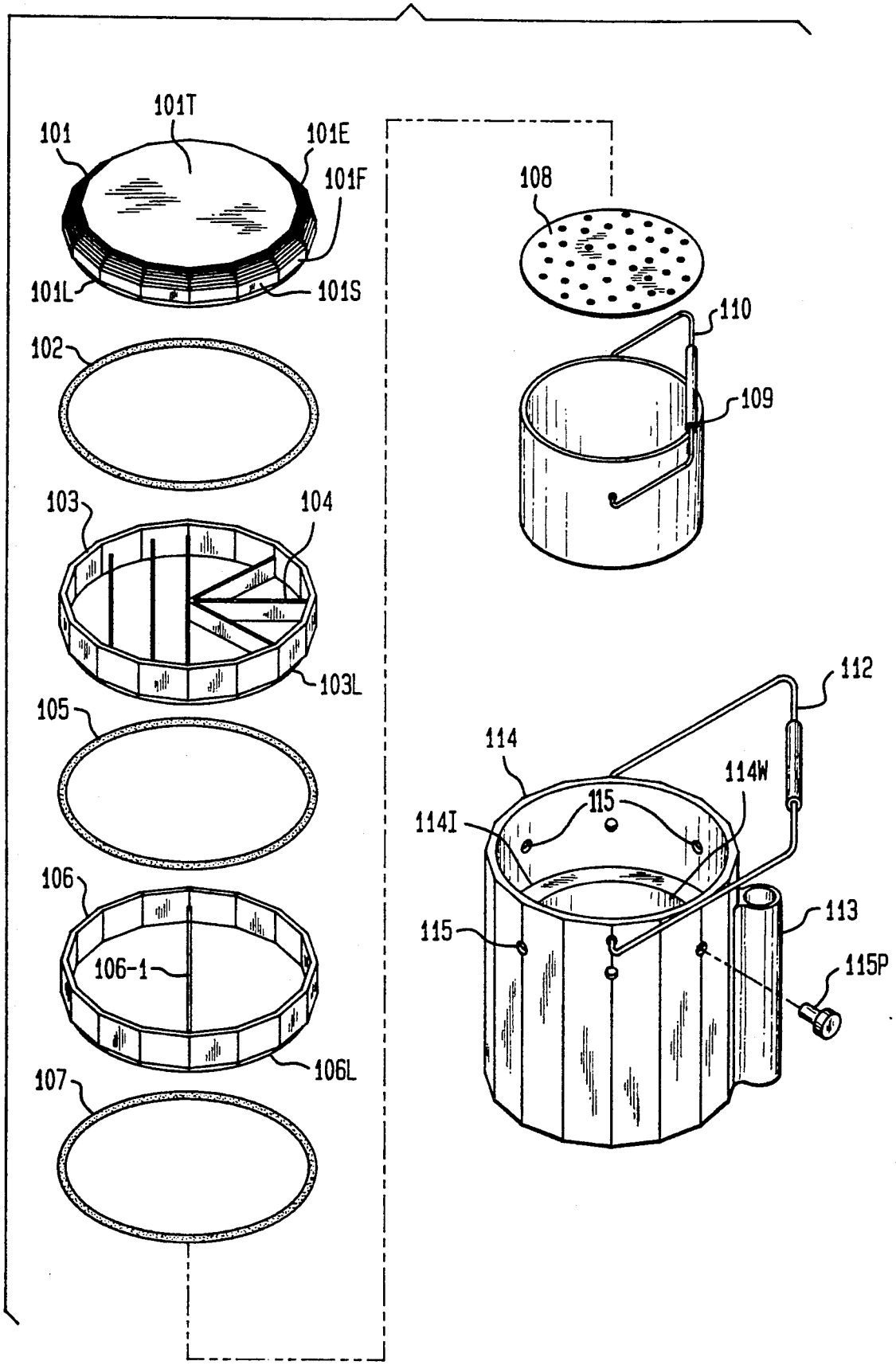
FIG. 1 is an exploded view of the main container, bait bucket, major accessory and light accessory trays and the seat lid.
Figure 2:
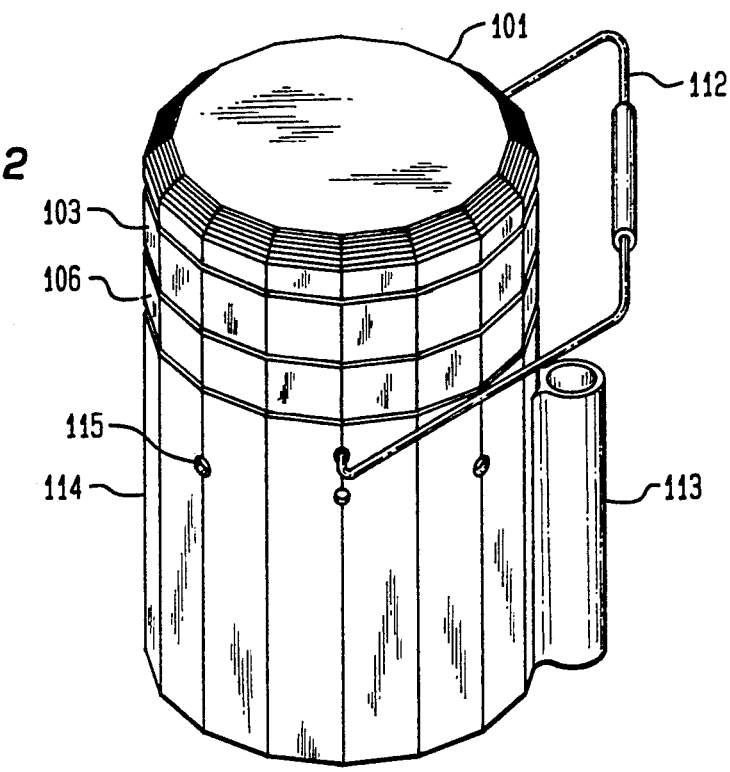
FIG. 2 is an exterior perspective view of the illustrative embodiment.

Referring now to FIG. 1, the exploded view shows the main container 114 at the lower right and the seat lid 101 at the upper left. The upper surface 101T of seat lid 101 is substantially flat with its edges 101E rounding to its side wall 101S. Side wall 101S may be cylindrical or, as shown in the drawing, may consist of a number of flat facets 101F. The lower exterior surface of seat lid 101 is undercut to form a lip 101L that slips inside the perimeter of upper tray 103. Advantageously, lip 101L may be provided with a circumferential groove (not shown in FIG. 1) for retaining O-ring 102. O-ring 102 allows seat lid 101 to be secured to upper tray 103 in a substantially water-tight manner.

Tray 103 is advantageously divided by an assortment of wall separators 104 to provide a number of different size compartments for accommodating a variety of hooks, fishing lures, rigs and leaders. The lower exterior surface of tray 103 is undercut to form a lip 103L that slips inside the perimeter of lower tray 106. Advantageously, lip 103L may be provided with a circumferential groove (not shown in FIG. 1) for retaining O-ring 105. O-ring 105 allows upper tray 103 to be secured to lower tray 106 in a substantially water-tight manner.

Tray 106 is advantageously made somewhat deeper than tray 103 in order to accommodate larger size fishing accessories such as extra weights, pliers, scalers, jigging lures, trolling weights, etc. The lower exterior surface of tray 106 is undercut to form a lip 106L that slips inside the perimeter of main container 114. Advantageously, lip 106L may be provided with a circumferential groove (not shown in FIG. 1) for retaining O-ring 107. O-ring 107 allows lower tray 106 to be secured to main container 114 in a substantially Water-tight manner.

Main container 114 includes an insulated well 114W for receiving bait bucket 109. Well 114W is surrounded by a layer of insulation 114I such as styrofoam. Bait bucket 109 includes a slosh lid 108 which contains a number of ventilating holes 108H. Above the level of insulating wall 114I but below the point at which lower tray projects into main container 114 the side wall of main container 114 is pierced by a plurality of ventilating holes 115. The exterior of main container 114 includes a fishing rod holder 113 for accommodating the shank of a fishing rod (not shown). A series of ventilating holes 115 is provided through the wall of main container 114 above the level that the top of bait bucket 109 reaches when resting on the floor of main container. The ventilating holes allow air to circulate through well 114W. Ventilating holes 115 may, if desired, be plugged by rubber plugs 115P so that the well be partially filled with cracked ice and used for transporting chillable items.

Figure 3:
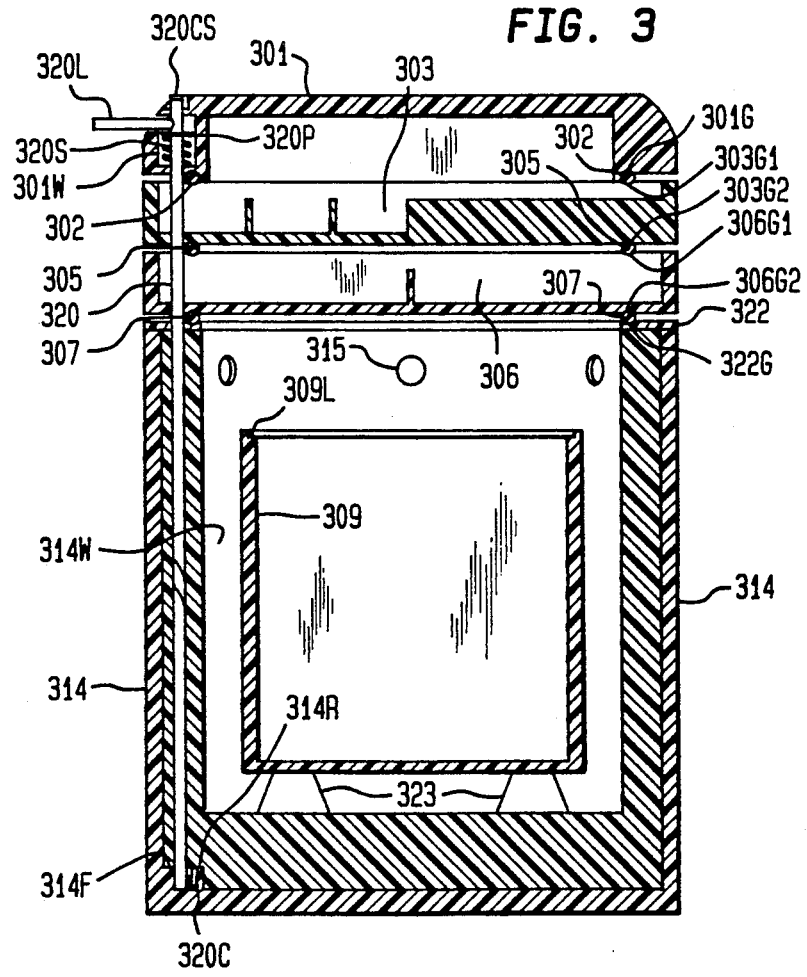
FIG. 3 is a cross-sectional detail through the wall of the main container showing the ventilating air space above the bait bucket and also depicting the detail of an alternative arrangement for swingably mounting the trays and seat lid.

Referring now to FIG. 3 there is shown a cross-sectional view of an alternative embodiment in which the seat lid 301, upper tray 303 and lower tray 306 are hinged to a spring-loaded, camable hinge post 320. The upper end of post 320 is threaded to receive a cap screw 320CS for retaining together the assemblage of seat lid 301, tray 303 and tray 306. The upper end of post 320 is fitted with a lever 320L by means of which the post may be rotated to cause cam wheel 320C at its lower end to ride ramp 314R on the under side of main container 314. In the rotational position shown, cam wheel 320C is in its uppermost position so that trays 303, 306 as well as seat lid 301 may be rotated about hinge post 320 to give the fisherman access to the contents of the trays and the bait bucket.

When lever 320L is rotated so that cam wheel 320C is moved off ramp 314R and on to flat 314F seat lid 301, tray 303 and tray 306 are compressed together against the top plate 322 of container 314 effecting a series of three water-tight seals. When lever 320L is rotated to position cam wheel on flat 314F, lever 320L rests in a recess in the side of seat lid 301. Cam wheel 320C is urged against flat surface 314F and ramp 314R by spring 320S which is positioned within well 301W of seat lid 301 to exert spring loading against collar 320P of post 320.

The water-tight sealing of the seat lid and trays is facilitated by O-rings 302, 305 and 307. O-ring 302 is retained in a pair of a hemi-toroidal grooves 301G, 303G1 provided, respectively, in seat lid 301 and the upper rim of upper tray 303. O-ring 305 is retained in a pair of hemi-toroidal grooves 303G2, 306GI in the lower rim of upper tray 303 and upper rim of lower tray 306, respectively. O-ring 307 is retained in a pair of hemi-toroidal grooves 306G2, 322G in the lower rim of lower tray 306 and circular sealing plate 322, respectively. Bait bucket 309 is shown seated on pillow blocks 323 on the floor of well 314W. The upper edge of bait bucket 309 is relieved to provide a recess for a slosh cover (not shown, but similar to cover 108 of FIG. 1). Ventilating holes 315 provide an access for air to preserve the bait alive. If desired for certain types of bait, well 314W may be partially filled with chopped ice and ventilating holes 315 may be plugged by rubber plugs (not shown), similar to plug 115P of FIG. 1. Also not shown in FIG. 3 are the bails for the bait bucket and the main container which, however, may advantageously be similar to the bails 110 and 112 of FIG. 1.

What has been described is believed to be illustrative of the principles of my invention. Further and other modifications may be apparent to those skilled in the art without however departing from the spirit and scope of my invention.

What is claimed is:

1. A fishing tackle box comprising an insulated, substantially cylindrical main container having a ventilated well, said ventilated well being dimensioned to accept a bait bucket, a bait bucket nestable within said ventilated well, a plurality of substantially cylindrical tackle trays nestable within said cylindrical container, said tackle trays being sealed against leakage from said bait bucket, seat lid and means for retaining together said seat lid, said trays and said container in a substantially cylindrical water-tight assembly.

2. A fishing tackle box according to claim 1 wherein said trays and said seat lid each include a hemi-toroidal grove for retaining an O-ring.

3. A fishing tackle box according to claim 2 wherein said trays include a cylindrical lip surface and wherein said hemi-toroidal groove is on said cylindrical lip surface of said trays.

4. A fishing tackle box according to claim 2 wherein said trays include a flat sealing surface and wherein said hemi-toroidal groove is on said flat surface of said trays.

5. A fishing tackle box according to claim 1 wherein said means for retaining together said seat lid, said trays and said container in a substantially cylindrical water-tight assembly includes a spring-loaded, camable hinge post.

6. A fishing tackle box according to claim 5 wherein said spring-loaded, camable hinge post includes a handle recessed in said seat lid.

7. A fishing tackle box according to claim 6 wherein said handle is operable to rotate said camable hinge post to compress together said water-tight assembly.

8. A fishing tackle box according to claim wherein the exterior surface of said main container includes an integral, hollow cylinder for accommodating a fishing pole.

9. A fishing tackle box according to claim 1 wherein said ventilated well includes a plurality of air holes and means for plugging said air holes.

* * * * *